(12) United States Patent
Falk et al.

(10) Patent No.: US 11,304,058 B2
(45) Date of Patent: Apr. 12, 2022

(54) SETTING UP ACCESS AUTHORIZATION TO ACCESS A SUBNETWORK OF A MOBILE RADIO NETWORK

(71) Applicant: Siemens Aktiengesellschaft, Munich (DE)

(72) Inventors: Rainer Falk, Poing (DE); Steffen Fries, Baldham (DE); Joachim Walewski, Unterhaching (DE)

(73) Assignee: SIEMENS AKTIENGESELLSCHAFT

( * ) Notice: Subject to any disclaimer, the term of this patent is extended or adjusted under 35 U.S.C. 154(b) by 0 days.

(21) Appl. No.: 16/973,978

(22) PCT Filed: Jun. 5, 2019

(86) PCT No.: PCT/EP2019/064682
§ 371 (c)(1),
(2) Date: Dec. 10, 2020

(87) PCT Pub. No.: WO2019/243054
PCT Pub. Date: Dec. 26, 2019

(65) Prior Publication Data
US 2021/0314775 A1 Oct. 7, 2021

(30) Foreign Application Priority Data

Jun. 18, 2018 (EP) .................... 18178316

(51) Int. Cl.
*H04L 29/06* (2006.01)
*H04W 12/08* (2021.01)
*H04W 48/18* (2009.01)

(52) U.S. Cl.
CPC ........... *H04W 12/08* (2013.01); *H04W 48/18* (2013.01)

(58) Field of Classification Search
CPC ...... H04W 12/08; H04W 48/18; H04W 63/10
See application file for complete search history.

(56) References Cited

U.S. PATENT DOCUMENTS 7,024,692 B1 * 4/2006 Schanze ............. H04L 63/0807
726/10
2005/0233729 A1 10/2005 Stojanovski et al.
(Continued)

FOREIGN PATENT DOCUMENTS

| CN | 108141433 A | 6/2018 |
| EP | 3277008 A1 | 1/2018 |
| GN | 101816140 A | 8/2010 |

OTHER PUBLICATIONS

"3rd Generation Partnership Project; Technical specification Group services and System Aspects; Security architecture and procedures for 5G system (Release 15)", 3GPP DRAFT; 33501-F00 AFTERS3#91CRS, 3rd Generation Partnership Project (3GPP), Mobile Competence Centre; 650, Route Des Lucioles ; F-06921 Sophia-Antipolis Cedex; France, No.; Mar. 1, 2018, XP051456883, retrieved URL:http://www.3gpp.org/ftp/Meetings%5F3GPP%5FSYNC/SA3/Docs, [gefunden am May 18, 2018], pp. 99-104; 2018.
(Continued)

*Primary Examiner* — Joseph P Hirl
*Assistant Examiner* — Ka Shan Choy
(74) *Attorney, Agent, or Firm* — Schmeiser, Olsen & Watts LLP

(57) ABSTRACT

Provided is a method for setting up access authorization for a subscriber apparatus to access a subnetwork of a mobile radio network, wherein the subnetwork is administrated by a mobile radio administration apparatus and the access authorization for the subscriber apparatus to access the subnetwork is checked by an access apparatus of the mobile radio network, wherein—access authorization to access the subnetwork is requested for the subscriber apparatus from
(Continued)

the mobile radio administration apparatus by a local administration apparatus,—a subnetwork authorization token is assigned to the subscriber apparatus by the mobile radio administration apparatus and transmitted to the subscriber apparatus, wherein the subscriber apparatus is authorized to access the subnetwork only if the subnetwork authorization token is transmitted from the subscriber apparatus to the subnetwork during an access request and is confirmed as valid.

20 Claims, 3 Drawing Sheets

(56) References Cited

U.S. PATENT DOCUMENTS

| | | | |
|---|---|---|---|
| 2009/0031131 A1 | 1/2009 | Qiu et al. | |
| 2011/0119743 A1* | 5/2011 | Gleim | H04L 63/107 |
| | | | 726/6 |
| 2012/0017271 A1* | 1/2012 | Smith | G06F 9/45558 |
| | | | 726/19 |
| 2013/0143524 A1* | 6/2013 | Hjelm | H04W 4/70 |
| | | | 455/410 |
| 2014/0115126 A1* | 4/2014 | Nam | H04L 45/66 |
| | | | 709/220 |
| 2015/0278548 A1 | 10/2015 | Brands | |
| 2017/0163636 A1* | 6/2017 | Nishida | H04L 63/083 |
| 2017/0164212 A1* | 6/2017 | Opsenica | H04L 41/0246 |
| 2017/0359768 A1* | 12/2017 | Byun | H04W 8/06 |
| 2018/0007552 A1* | 1/2018 | Bae | H04L 63/08 |
| 2018/0324187 A1 | 11/2018 | Heintel et al. | |
| 2021/0243600 A1* | 8/2021 | Yu | H04W 12/72 |

OTHER PUBLICATIONS

ITU International Telecommunication Union; ITU-T Recommendation X.509; https://www.itu.int/rec/T-REC-X.509.

3GPP TR 28.801; Jan. 2018; http://www.3gpp.org/ftp/Specs/archive/28_series/28.801/retrieved: Jun. 19, 2018.

PCT International Search Report and Written Opinion of International Searching Authority dated Aug. 28, 2019 corresponding to PCT International Application No. PCT/EP2019/064682 filed May 6, 2019.

Non-English European Search Report for Application No. 18178316.8, dated Oct. 26, 2018.

Chinese Office Action for Application No. 201980041323.6, dated Jul. 23, 2021.

* cited by examiner

US 11,304,058 B2

SETTING UP ACCESS AUTHORIZATION TO ACCESS A SUBNETWORK OF A MOBILE RADIO NETWORK

CROSS-REFERENCE TO RELATED APPLICATIONS

This application claims priority to PCT Application No. PCT/EP2019/064682, having a filing date of Jun. 5, 2019, which is based off of EP Application No. 18178316.8, having a filing date of Jun. 18, 2018, the entire contents both of which are hereby incorporated by reference.

FIELD OF TECHNOLOGY

The following relates to a method, to an assistance system, to a subscriber device and to a computer program product for setting up access authorization for a subscriber device to access a subnetwork of a mobile radio network, wherein the subnetwork is administered by a subnetwork operator by way of a mobile radio administration device, and the access authorization for the subscriber device to access the subnetwork is checked by way of an access device of the mobile radio network of a mobile radio network operator.

BACKGROUND

In a future mobile radio network, in particular in a fifth-generation (5G) mobile radio network which is in the process of being standardized by the 3rd Generation Partnership Project 3GPP, various types of network scenarios and network operators will be supported. In addition to operators of public mobile radio networks, provision is also made for local, private, isolated subnetwork operators that operate a real, independent mobile radio network or a subnetwork in a superordinate mobile radio network. Generally speaking, only subscribers or subscriber devices from a limited subscriber group are able to gain access to the subnetwork.

In mobile radio networks, central network components, hereinafter also referred to as authorization servers, are usually used to authenticate subscribers and to manage their network access authorization. In third-generation, fourth-generation and even fifth-generation mobile radio networks in accordance with the 3GPP standard, such central network components are referred to for example as authentication servers (AAA servers), home subscriber servers (HSS) or user profile servers (UPS). Network access authorizations for the subscribers and information regarding services able to be used by the subscriber are generally fixedly configured. Changes may be made centrally by an administrator of a mobile radio network operator.

In addition to subscribers, subnetworks may also be set up and administered within a future 5G mobile radio network. Such subnetworks are also referred to as "network slices". In this case, a network slice is able to be generated, changed, activated, deactivated or even deleted. A subnetwork is configured for example by a subnetwork management function (NSMF) of the mobile radio network. A subnetwork operator, in order to administer the subnetwork, does not however access the subnetwork management function directly, but rather accesses the subnetwork management function (NSMF) via a pre-stored client subnetwork management function (CSMF), which is referred to hereinafter as mobile radio administration device. Exemplary functions and communication options are described for example in the 3GPP report TR 28.801.

Document EP 3 277 008 A1 discloses a subscriber identity element for authenticating a communication device to a communication network, wherein the communication network comprises a subnetwork containing a profile server.

The 3rd Generation Partnership Project; Technical Specification Group Services and System Aspects; Security architecture and procedures for 5G system (Release 15), 3GPP DRAFT; 35501-F00_AFTERS3 #91 CRS, 3RD GENERATION PARTNERSHIP PROJECT (3GPP), MOBILE COMPETENCE CENTRE; 650, ROUTE DES LUCIOLES; F-06921 SOPHIA-ANTIPOLIS CEDEX; FRANCE, No. 20180301 May 18, 2018 (2018 May 18) describes authorization of network function service access in a fifth-generation mobile radio network by way of a web token in accordance with JavaScript object notation, JSON token for short, which is performed in accordance with an Outh 2.0 method from the Internet Engineering Task Force IETF.

Document US 2015/278548 A1 discloses a device that receives an access token from another device via a short-range communication and uses this token to receive access.

If such a subnetwork is used in an industrial environment, a flexible configuration of subscribers with access authorization is necessary. By way of example, in order to provide an external service, when commissioning an installation or when troubleshooting in the installation, there is the need to temporarily or permanently grant access to the subnetwork for other subscribers.

SUMMARY

An aspect relates to be able to flexibly set up, change and manage profile data of a mobile radio subscriber, and in particular access authorization to access the subnetwork.

A first aspect of embodiments of the invention relates to a method for setting up access authorization for a subscriber device to access a subnetwork of a mobile radio network, wherein the subnetwork is administered by a subnetwork operator by way of a mobile radio administration device and the access authorization for the subscriber device to access the subnetwork is checked by way of an access device of the mobile radio network of a mobile radio operator, wherein access authorization to access the subnetwork is requested from a local administration device of the subnetwork operator to the mobile radio administration device of the mobile radio operator for the subscriber device, a subnetwork authorization token is assigned to the subscriber device by the mobile radio administration device and is transmitted to the subscriber device, and such an association is communicated to a subnetwork access server, wherein the subscriber device is authorized to access the subnetwork only when the subnetwork authorization token is transmitted to the subnetwork in the event of an access request from the subscriber device and is confirmed as valid by the subnetwork access server or by an authorization server.

Thus, in the event of an access request from the subscriber device, which is normal in the mobile radio network, the access authorization for the subscriber device to access the subnetwork is able to be checked on the basis of the previously requested and assigned subscriber authorization token. This corresponds to a large extent to the known and used access authorization check in a mobile radio network and at the same time takes into account the access authorization, administered by a subnetwork operator, for a subscriber device.

A subscriber device may be a mobile radio device, a subscriber of a mobile radio device or else a device, for example in an industrial installation, that is connected to other subscriber devices or other components via the subnetwork and communicates therewith. The mobile radio administration device may correspond for example to a customer slice management function (CSMF) of a 5G mobile radio network. A local administration device is in this case available to a subnetwork operator for administering the subnetwork. The local administration device may in this case be associated with the subnetwork operator.

In one advantageous embodiment, the subscriber device is authorized to access the subnetwork only when the subscriber device is additionally authorized by the access device to access the mobile radio network.

All subscriber devices that are authorized to access the public mobile radio network may thereby receive flexible access to a subnetwork of the mobile radio network. It is not necessary for a mobile radio network operator to have configured the access authorization for a subscriber device to access a subnetwork as permissible beforehand. Flexible usage scenarios are thereby made possible. By way of example, a subnetwork authorization token may be requested from the mobile radio administration device and assigned via the local administration device for a maintenance device with mobile radio connectivity. A service engineer is able to access the subnetwork via this maintenance device and for example perform diagnostics or troubleshooting there. A subnetwork authorization token may be used by a replacement device in order to directly obtain access to the subnetwork without the replacement device itself having to be assigned a separate subnetwork authorization token. It is therefore in particular advantageous for the authorization of the subscriber device to access the mobile radio network and the authorization to access the subnetwork to be checked independently of one another. To this end, it is furthermore advantageous not to couple the subnetwork authorization token directly to access authorization for the subscriber device to access the mobile radio network.

In one advantageous embodiment, a subnetwork access server is set up when a subnetwork is set up, and the subnetwork authorization token is associated with a subnetwork, in particular a subnetwork identifier of the subnetwork, in the subnetwork access server.

This has the advantage that the access authorizations to access a subnetwork are able to be stored and administered centrally in a server. This allows extensive decoupling of the subnetworks and their administration by for example different network operators or by the mobile radio network operator. Independent, flexible administration of the subnetwork is thus possible locally by the subnetwork operator in addition to general user administration performed by a mobile radio operator.

In one advantageous embodiment, access for the subscriber device to the subnetwork is authorized only when the association between the subnetwork authorization token and the subnetwork is confirmed.

In particular the case of operationally critical subnetworks, such as for example security networks or networks with a real-time requirement, it is thereby very reliably possible to prevent an unauthorized subscriber device from gaining access to the subnetwork.

In one advantageous embodiment, the association is determined by querying the subnetwork access server.

This has the advantage that the check of the access authorization to access the subnetwork is able to be performed without adjusting the other authorization servers in the mobile radio network, and it is thus not necessary to adapt the usual mobile radio access procedures, and in particular to update corresponding authorization servers in the mobile radio network.

In one advantageous embodiment, information regarding the association between the subnetwork authorization token and the subnetwork by the subnetwork access server is transmitted to an authorization server of the mobile radio network, and the association between the subnetwork authorization token and the subnetwork is determined by querying the authorization server.

This has the advantage that it is not necessary to contact any additional devices, such as in this case the subnetwork access server, when authorizing access for the subscriber device. The number of devices to be contacted in the case of an access check, and thus the communication paths, is thereby able to be optimized.

In one advantageous embodiment, the subnetwork authorization token is received by the subscriber device via a data communication connection or via a near-field communication connection NFC or by scanning an optical code or a manual input unit.

A subscriber device is thus able to receive the subnetwork authorization token via a near-field communication connection using a near-field tag, often also called RFID tag, or by scanning a QR code, or through a manual input via an input device. No direct coupling between the subscriber device and the local administration device, for example via a data communication connection, is thereby necessary.

In one advantageous embodiment, the subnetwork authorization token contains at least one parameter that needs to be met in order to gain access authorization to access the subnetwork.

This has the advantage that, using the at least one parameter, further criteria for the subscriber device to access the network are able to be checked and ensured by checking the subnetwork authorization token. The subnetwork authorization token may be coded for example as a token in JavaScript object notation (JSON token), as a file in an extensible markup language XML, as an attribute certificate in accordance with an X.509 standard from the International Telecommunication Union ITU, as an ASN.1 data structure coded in accordance with basic encryption rules (BER), a security assertion markup language (SAML) token or as a text string.

Access authorizations or restrictions for the subnetwork may in this case be set up using the parameters of the subnetwork authorization token. Such parameters are for example:

the subnetwork identifier itself or a sub-subnetwork identifier that further restricts the local access region for accessing the subnetwork;

a permitted recurring time interval for accessing the subnetwork, for example a daily time interval between 8 p.m. and 12 p.m.; or a validity time interval of the subnetwork authorization token.

The parameters may furthermore be used to specify for example the type of the mobile radio subscriber identifier by way of which the subscriber device is able to register on the subnetwork. Using a parameter of this kind, it is also possible to set up coupling between the subnetwork authorization token and the mobile radio identifier of the subscriber, such that only a specific subscriber device with the specified mobile radio identifier is able to use the subnetwork authorization token for access authorization to access the subnetwork. Further restrictions may also for example relate to the permitted services or to communication protocols to be used that the subscriber device is able to use via the subnetwork.

In one advantageous embodiment, the subnetwork authorization token is stored on an internal memory of the subscriber device.

Only a subscriber device that has been assigned the subnetwork authorization token is thus able to use this to access the subnetwork, and access by unpermitted subscriber devices is thus able to be minimized.

In one advantageous embodiment, the subnetwork authorization token is stored on a security module, wherein the security module is connected detachably to the subscriber device and is stored in the security functions of the mobile radio network. The security module may be designed separately from a subscriber identity module of the mobile radio network or integrated therewith by way of a data communication connection, for example.

This has the advantage that a service engineer is for example able to use different subscriber devices by coupling his security module to different subscriber devices.

In one advantageous embodiment, the subnetwork is a control network of an industrial installation and is used to transmit control communication to a jointly used control server outside the subnetwork.

In one advantageous embodiment, the mobile radio network is designed in accordance with a fifth-generation mobile radio standard of the Third Generation Partnership Project.

In one advantageous embodiment, the mobile radio network and in particular the mobile radio administration device are administered by a mobile radio network operator, and the subnetwork, and in particular the local administration device, are administered by a subnetwork operator, wherein the mobile radio network operator is different from the subnetwork operator.

This has the advantage that the subnetwork is able to be operated by a subnetwork operator that is independent of a mobile radio network operator and is able to receive infrastructure or local access authorization to access part of the network of the mobile radio network operator from the mobile radio network operator.

A second aspect of embodiments of the invention relates to an assistance system for setting up access authorization for a subscriber device to access a subnetwork of a mobile radio network, wherein the subnetwork is administered by a subnetwork operator by way of a mobile radio administration device and the access authorization for the subscriber device to access the subnetwork is checked by way of an access device of the mobile radio network of a mobile radio network operator, comprising a local administration device that is designed to request access authorization for the subscriber device to access the subnetwork in the case of a mobile radio administration device of the mobile radio operator and the mobile radio administration device is designed to assign a subnetwork authorization token to the subscriber device and to transmit it to the subscriber device and to communicate such an association to a subnetwork access server, wherein the subscriber device is authorized to access the subnetwork only when the subnetwork authorization token is transmitted in the event of an access request from the subscriber device to the subnetwork and is confirmed as valid by the subnetwork access server or by an authorization server.

In one advantageous embodiment, the assistance system furthermore has a subnetwork access server that is set up when a subnetwork is set up and is designed to associate the subnetwork authorization token with a subnetwork, in particular a subnetwork identifier of the subnetwork, and to perform the method in accordance with the above features.

A third aspect of embodiments of the invention relates to a subscriber device for setting up access authorization to access a subnetwork of a mobile radio network, wherein the subnetwork is administered by way of a mobile radio administration device and the access authorization for the subscriber device to access the subnetwork is checked by way of an access device of the mobile radio network that is designed to receive a subnetwork authorization token transmitted by the mobile radio administration device via a local administration device and to transmit the subnetwork authorization token and a mobile radio identifier of a subscriber to the access device in order to gain access to the subnetwork in accordance with the above method.

A fourth aspect of embodiments of the invention relates to a computer program product (non-transitory computer readable storage medium having instructions, which when executed by a processor, perform actions) that is able to be loaded directly into a memory of at least one digital computer, comprising program code parts that are suitable for performing the steps of the described method.

The expression "computer" should be interpreted as broadly as possible in order in particular to cover all electronic devices having data processing properties. Computers may thus for example be personal computers, servers, hand-held computer systems, pocket PC devices, mobile radio devices and other devices of the mobile radio network or subnetwork that are able to process data in a computer-aided manner, processors and other electronic data processing devices.

BRIEF DESCRIPTION

Some of the embodiments will be described in detail, with reference to the following figures, wherein like designations denote like members, wherein.

Parts that correspond to one another are provided with the same reference signs in all of the figures.

DETAILED DESCRIPTION

Figure 1:
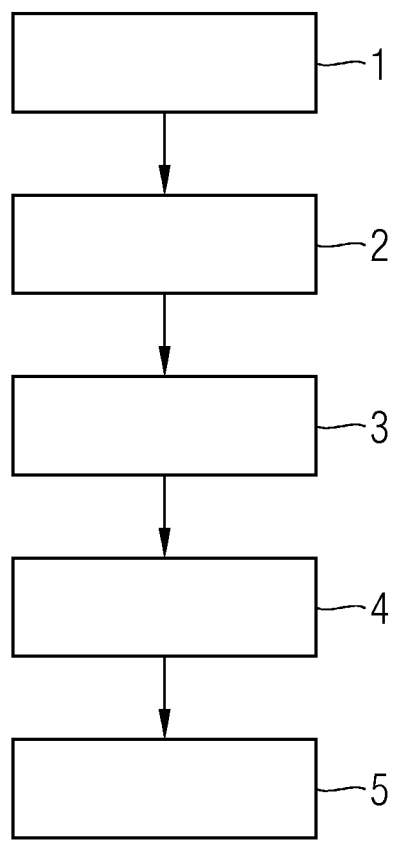
FIG. 1 shows an exemplary embodiment of the method according to the invention in the form of a flowchart.

FIG. 1 illustrates an exemplary embodiment of the method according to embodiments of the invention in the form of a flowchart. The method according to embodiments of the invention is used to set up access authorization for a subscriber device to access a subnetwork of a mobile radio network. In a mobile radio network, such as for example a fifth-generation mobile radio network standardized by 3GPP, there is the option of administering a locally limited subregion of the mobile radio network for a client, which is referred to hereinafter as subnetwork operator. A mobile radio administration device, via which a subnetwork operator is able to administer the subnetwork, is provided as administration interface between the subnetwork operator and the mobile radio network. Access authorization for the subscriber device to access a subnetwork is checked by way of an access device of the mobile radio network. The access device communicates with further components of the mobile radio network in order to check the access authorization, in particular authorization servers, which provide information regarding permitted services and access authorizations for the subscriber device.

In order then to set up access authorization for the subscriber device to access a subnetwork, access authorization to access the subnetwork is requested from a local administration device of the subnetwork operator to the mobile radio administration device of the mobile radio operator for the subscriber device in a first step 1. A subnetwork authorization token is then assigned to the subscriber device in the mobile radio administration device, see method step 2, and transmitted to the subscriber device, see method step 3. In the event of an access request, the subscriber device transmits the received subnetwork authorization token to the subnetwork, see method step 4. In other words, if a subscriber device wishes to set up a connection to the subnetwork, it transmits for example, in the event of an access request, the subnetwork authorization token in addition to the usual request parameters for the mobile radio network.

The subscriber device is however authorized to access the subnetwork only when the subnetwork authorization token is confirmed as valid by the mobile radio network or the access device in method step 5. Mobile radio network access authorization for the subscriber device is also checked in addition to the subnetwork authorization token, such that only the subscriber devices that are authorized to access the mobile radio network are also able to gain access to the subnetwork.

When assigning the subnetwork authorization token to the subscriber device, the subnetwork authorization token is associated with a subnetwork, and the subnetwork is in particular identified by a subnetwork identifier, such that an association between the subnetwork authorization token and a subnetwork identifier is set up. This may be performed in the mobile radio administration device. However, a subnetwork access server is set up when a subnetwork is set up, and the association between subnetwork authorization token and subnetwork identifier is stored and managed.

The subnetwork authorization token contains at least one parameter that is checked when the access authorization is checked, and access is then authorized only when the parameter or a criterion connected thereto is met. The subnetwork authorization token may be coded for example as a JSON token, as an XML, file, as an X.509 attribute certificate, as a BER-coded ASN.1 data structure, as an SAML token or as a text string.

Figure 2:
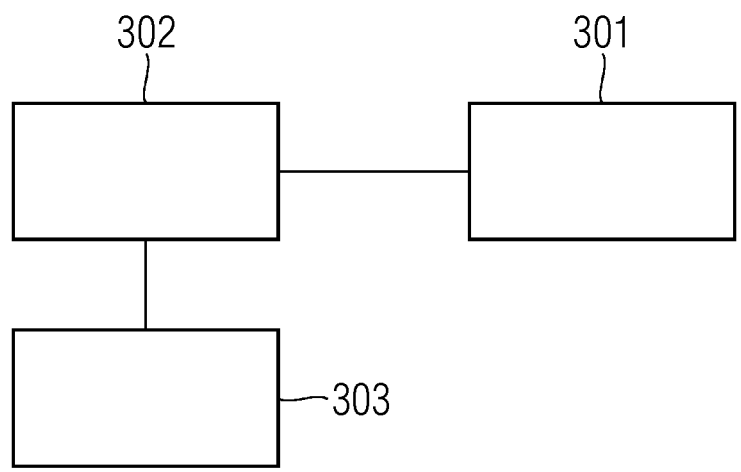
FIG. 2 shows an exemplary embodiment of the assistance system according to the invention in a block diagram.

FIG. 2 shows an assistance system consisting of a local administration device 301, a mobile radio administration device 302 and a subnetwork access server 303. The local administration device 101 is connected to the mobile radio administration device 102 via a wired or else wireless connection. The subnetwork access server 303 is connected to the mobile radio administration device 302 and stores the subnetwork access tokens assigned by the mobile radio administration device 302; in this case in particular the association between the subnetwork identifier and the subnetwork authorization token of the subscriber device is also managed and for example queried by mobile radio network components in the event of access authorizations. The subnetwork access server 303 may also be designed in an integrated manner as a subfunction in such a mobile radio component, in particular an authorization server. The subnetwork access server 303 is set up when a subnetwork is set up. The local administration device 301, the mobile radio administration device 302 and the subnetwork access server 303 comprise at least one digital processor that executes said functions.

Figure 3:
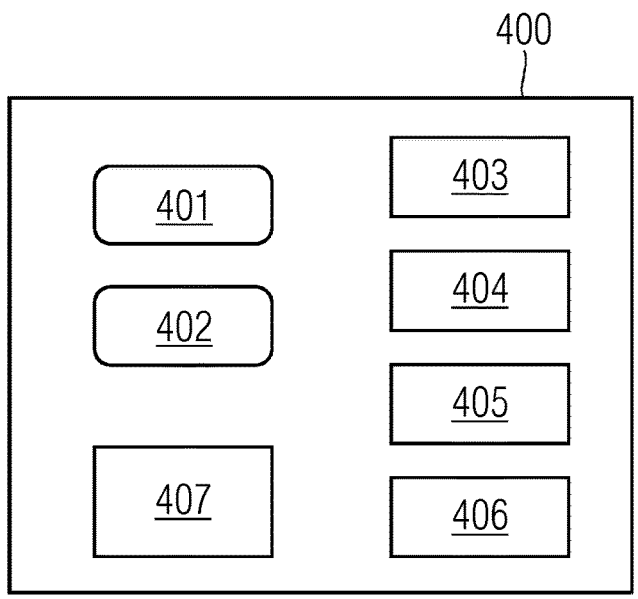
FIG. 3 shows an exemplary embodiment of the subscriber device according to the invention in a block diagram.

FIG. 3 then shows a subscriber device 400. The subscriber device 400 has an internal memory 401 in which the assigned subnetwork authorization token is stored. As an alternative, the subnetwork authorization token may be stored on a security module that is connected detachably to the subscriber device 400. The security module may be designed similarly to a subscriber identity module 402, which is likewise arranged in the subscriber device 400.

As an alternative, the subnetwork authorization token may additionally be stored on the subscriber identity module 402. The subnetwork authorization token requested by the mobile radio administration device may be transmitted to the local administration device and stored there, for example for further administrative functions. The subscriber device 400 comprises a data communication interface 403 in order to receive the subnetwork authorization token, for example from the local administration device 301.

As an alternative or in addition, the subscriber device 400 has a near-field communication interface 404 so that the subnetwork authorization token, which is for example in the form of a radio tag, also referred to as RFID transponder, is able to be read. A subnetwork authorization token coded as a two-dimensional barcode, also referred to as QR code, may also be received by the subscriber device via an optical interface 405, for example. The subscriber device furthermore comprises a manual input interface 406, for example a panel of buttons or an externally connectable keyboard, a touch-sensitive screen, on which the subnetwork authorization token is input manually. The subscriber device thus supports a multiplicity of input options and thus supports different distribution strategies for the subscriber authorization token.

The subscriber device 400 furthermore comprises a control unit 407 that comprises functions for checking the access authorization, such as for example transmitting an access request that contains the subnetwork authorization token. Said modules and interfaces and the control unit 407 of the subscriber device 400 are implemented in the form of hardware or else in the form of software on at least one processor, wherein a processor is in particular a main processor, a microprocessor or a microcontroller, possibly in combination with a storage unit for the storage of program commands.

Figure 4:
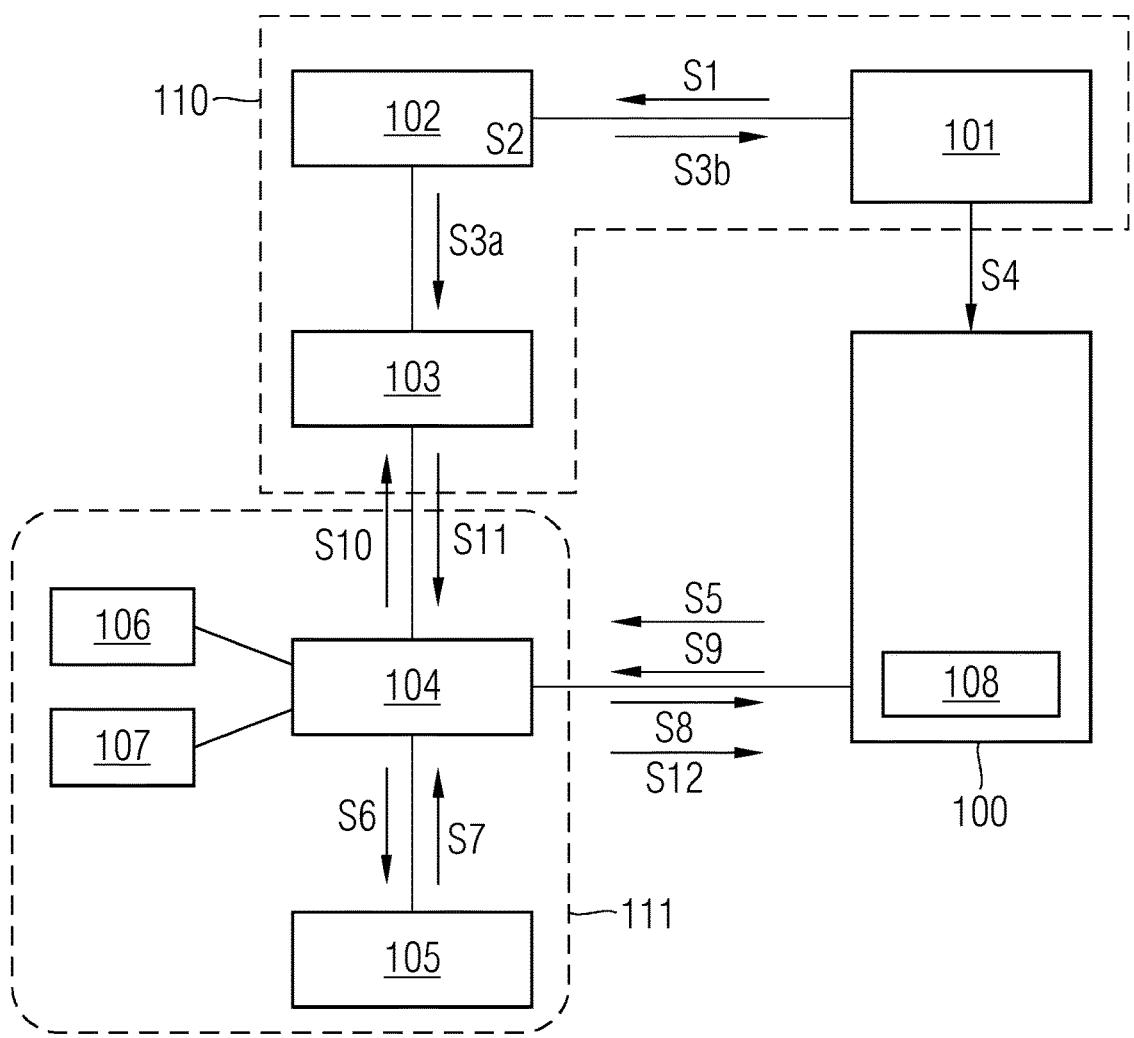
FIG. 4 shows a second exemplary embodiment of the method according to the invention based on a message exchange in a first mobile radio network scenario.

FIG. 4 then shows one exemplary implementation of the method in a mobile radio network 111. By way of example, an access device 104 of the mobile radio network 111 is illustrated. These may be for example a mobile radio network antenna and further control devices of the mobile radio access network or of the mobile radio network core network. Such an access device 104 may for example grant access only to a subnetwork 107 administered by a subnetwork operator. An access device 104 may however also, as access device, provide access to a publicly accessible part of the mobile radio network 106. The illustrated subnetwork 107 or the illustrated public mobile radio network 106 may thus be reached via the access device 104.

A subnetwork 107 may be used for example as a control network of an industrial installation or for a spatially defined terrain such as for example a harbor area, a factory floor, in order to provide non-public data communication in this subnetwork. The control communication in the subnetwork 107 may in particular be exchanged using a control server arranged outside the subnetwork. The communication connection between a subscriber device 100 that is connected via the subnetwork 107 and a control server used in distributed form, also referred to as cloud server, may in particular be used. Such a control server is used jointly by multiple users. The mobile radio network 111 is designed for example in accordance with a fifth-generation mobile radio standard. The subnetwork is typically administered by a subnetwork provider, whereas a mobile radio network operator provides the infrastructure for operating the mobile radio network and manages and checks administration functions and authorization servers 105 for checking access authorizations and other for example user authorizations for services.

An assistance system 110 is illustrated connected to the mobile radio network, which assistance system has a local administration device 101, a mobile radio administration device 102 and a subnetwork access server 103. The local administration device 101 is used by the subnetwork operator to administer the subnetwork. The mobile radio administration device 102 is provided by mobile radio operators as access device for administering the subnetwork as part of the mobile radio network.

In order to allow a subscriber device 100 to access a subnetwork 107, the local administration device 101 requests a subnetwork authentication token for a particular subnetwork. A corresponding message is transmitted to the mobile radio administration device 102 in step S1 and comprises a subnetwork identifier of the desired subnetwork. The mobile radio administration device 102 generates a subnetwork authorization token, see S2, and creates an association between the subscriber and the subnetwork authorization token and the subnetwork identifier. Such an association is communicated to the subnetwork access server, see S3a. In parallel therewith, the mobile radio administration device 102 transmits the subnetwork authorization token, in step S3b, to the subscriber device 100 via the local administration device 101, see S3b and S4.

The subnetwork authorization token is stored in the subscriber device 100, for example on a mobile radio identification module 108, on which the mobile radio identification identifiers for accessing the mobile radio network are also stored.

The subscriber device 100 may then register on the access device 104 of the mobile radio network. To this end, in step S5, it transmits its mobile radio identifier, for example a network access identifier, a pseudonym network access identifier, in which for example a mobile radio identifier or an identifier of the mobile radio device as such or a MAC address of the mobile radio device are coded. An extensible authentication protocol of the type AKA (EAP-AKA) or else EAP-TLS or EAP-TTLS may be used as authentication and encryption unification protocol. The subscriber device is then authenticated by an authorization server 105, for example a subscriber profile server, an authentication server or a home subscription server, see S6, and the subnetwork access server is provided with profile data of the subscriber device 100, S7.

The subscriber device receives confirmation of authorization to access a public mobile radio network, S8. In order to gain this access to the subnetwork 107, the subscriber device 100 then transmits the subnetwork authorization token, for example in a separate message, S9, for example together with the subnetwork identifier that is intended to be accessed and a mobile radio identifier of the subscriber, to the access device 104, see S9.

The access device 104 then transmits a query to the subnetwork access server 103, S10. This checks whether an appropriate association between the subnetwork authorization token and the subnetwork identifier and the mobile radio subscriber identifier is present and confirms this to the subscriber device via the access device 104, see S11, S12. Since, in the scenario described, the authorization server 105 does not contain any information about further access authorizations, in particular for accessing the subnetwork, the subnetwork access server 103 is contacted in step S10 and S11 and an access authorization to access the subnetwork is checked by confirming an association between the subnetwork authorization token and the subnetwork identifier and possibly furthermore the mobile radio network identifier.

Figure 5:
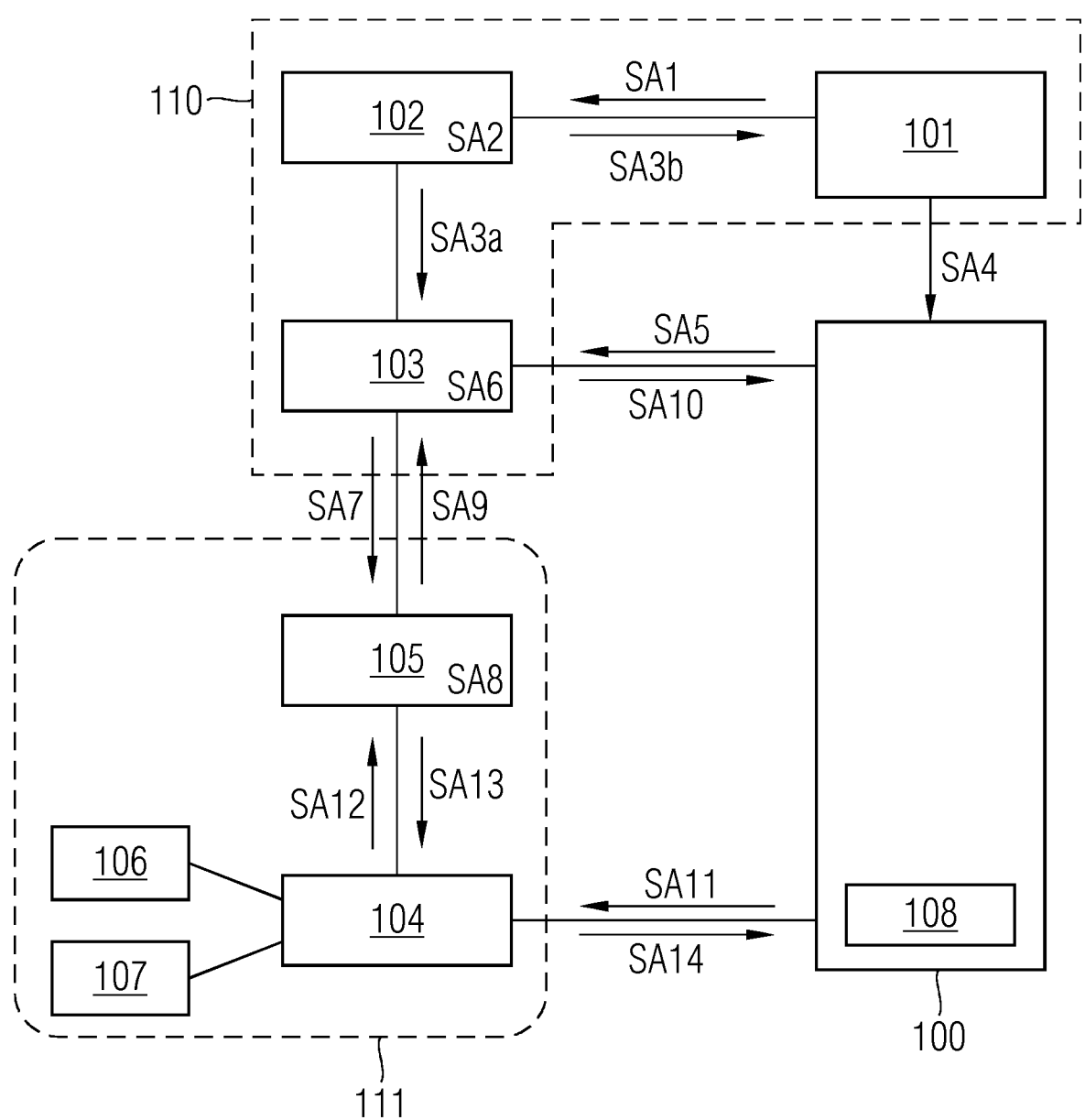
FIG. 5 shows a third exemplary embodiment of the method according to the invention based on a message exchange in a mobile radio network scenario.

FIG. 5 shows an exemplary embodiment in which access authorization to access the subnetwork is performed from the subnetwork access server 103 to the authorization server 105 prior to a check on the access authorization to access the mobile radio network.

Following the request and assignment of a subnetwork authorization token in accordance with the procedure described in FIG. 4, see SA1 to SA4, the subscriber device 100 transmits an access request SA5 to the subnetwork access server 103 and communicates thereto in said request the assigned subnetwork authorization token, the subnetwork identifier of the subnetwork to which access is requested, and a mobile radio identifier of the subscriber device 100. The subnetwork access server 103 then checks whether there is an association between the subnetwork authorization token and the subnetwork identifier, see SA6. If this is the case, the subnetwork access server 103 transmits the authorization information of the subscriber device 100 to access the subnetwork 107 to the authorization server 105, see SA7, and confirms successful registration to the subscriber device 100, see SA9 and SA10.

In the event of a subsequent access request from the subscriber device 100 to the access device 104, see SA11, the subscriber device 100 communicates the subnetwork identifier and/or the subnetwork authorization token assigned thereto to the access device 104. This information is forwarded to the authorization server 105 (SA12). When the subscriber profile data are checked in the authorization server 105, authorization information, for example in the form of an association between the subnetwork identifier and the subnetwork authorization token and/or the subscriber identifier, is checked. A response message dependent on the result of the check is then transmitted to the subscriber device 100, see SA13, SA14. The subscriber device 100 is thus authorized to access the subnetwork 107.

In one embodiment, the subscriber device 100 may be registered at the subnetwork access server 103 and the authorization server 105 may subsequently be updated only prior to the initial access to the subnetwork 107. In another embodiment, this registration may however also be performed at the first access attempt or upon each access request from the subscriber device 100 to access the subnetwork 107.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for setting up access authorization for a subscriber device to access a subnetwork of a mobile radio network, wherein the subnetwork is administered by way of a mobile radio administration device and the access authorization for the subscriber device to access the subnetwork is checked by way of an access device of the mobile radio network, the method comprising:
    requesting, by a local administration device, to the mobile radio administration device, access authorization for the subscriber device to access the subnetwork,
    assigning a subnetwork authorization token to the subscriber device by the mobile radio administration device and transmitting the subnetwork authorization token to the subscriber device, and
    communicating such an association to a subnetwork access server, wherein the subscriber device is authorized to access the subnetwork only when the subnetwork authorization token is transmitted to the subnetwork in the event of an access request from the subscriber device and is confirmed as valid by the subnetwork access server or by an authorization server.

2. The method as claimed in claim 1, wherein the subscriber device is authorized to access the subnetwork only when the subscriber device is additionally authorized by the access device to access the mobile radio network.

3. The method as claimed in claim 1, wherein the subnetwork access server is set up when the subnetwork is set up, and the subnetwork authorization token is associated with the subnetwork in the subnetwork access server.

4. The method as claimed in claim 1, wherein access to the subnetwork for the subscriber device is authorized only when the association between the subnetwork authorization token and the subnetwork is confirmed.

5. The method as claimed in claim 4, wherein the association is determined by querying the subnetwork access server.

6. The method as claimed in claim 4, wherein information regarding the association between the subnetwork authorization token and the subnetwork is transmitted from the subnetwork access server to an authorization server of the mobile radio network and the association is determined by querying the authorization server.

7. The method as claimed in claim 1, wherein the subnetwork authorization token is received by the subscriber device via a data communication connection or via a near-field communication connection or by scanning an optical code or via a manual input unit.

8. The method as claimed in claim 1, wherein the subnetwork authorization token contains at least one parameter that needs to be met in order to gain access authorization to access the subnetwork.

9. The method as claimed in claim 1, wherein the subnetwork authorization token is stored on an internal memory of the subscriber device.

10. The method as claimed in claim 1, wherein the subnetwork authorization token is stored on a security module, wherein the security module is connected detachably to the subscriber device and is stored in the security functions of the mobile radio network.

11. The method as claimed in claim 1, wherein the subnetwork is a control network of an industrial installation, and is used to transmit control communication to a control server outside the subnetwork.

12. The method as claimed in claim 1, wherein the mobile radio network is designed in accordance with a fifth-generation mobile radio standard of the Third Generation Partnership Project.

13. The method as claimed in claim 1, wherein the mobile radio network is administered by a mobile radio network operator, and the subnetwork and the local administration device is administered by a subnetwork operator, and wherein the mobile radio network operator is different from the subnetwork operator.

14. The method as claimed in claim 1, wherein the subnetwork authorization token is associated with a subnetwork identifier of the subnetwork in the subnetwork access server.

15. The method as claimed in claim 1, wherein the subnetwork authorization token is stored on a subscriber identity module of the mobile radio network.

16. The method as claimed in claim 1, wherein the mobile radio administration device is administered by a mobile radio network operator, and the subnetwork and the local administration device is administered by a subnetwork operator, and wherein the mobile radio network operator is different from the subnetwork operator.

17. An assistance system for setting up access authorization for a subscriber device to access a subnetwork of a mobile radio network, wherein the subnetwork is administered by way of a mobile radio administration device and the access authorization for the subscriber device to access the subnetwork is checked by way of an access device of the mobile radio network, comprising:
    a local administration device that is designed to request access authorization from a mobile radio administration device for the subscriber device to access the subnetwork,
    wherein the mobile radio administration device is designed to assign a subnetwork authorization token to the subscriber device and to transmit the subnetwork authorization token to the subscriber device and to communicate such an association to a subnetwork access server,
    wherein the subscriber device is authorized to access the subnetwork only when the subnetwork authorization token is transmitted in the event of an access request from the subscriber device to the subnetwork and is confirmed as valid by the subnetwork access server or by an authorization server.

18. The assistance system as claimed in claim 17, wherein the subnetwork access server is set up when a subnetwork is set up, and is designed to associate the subnetwork authorization token with a subnetwork.

19. A subscriber device for setting up access authorization to access a subnetwork of a mobile radio network, wherein the subnetwork is administered by way of a mobile radio administration device and the access authorization for the subscriber device to access the subnetwork is checked by way of an access device of the mobile radio network that is designed to receive a subnetwork authorization token transmitted from the mobile radio administration device via a local administration device and to transmit the subnetwork authorization token and a mobile radio identifier of a subscriber to the access device in order to gain access to the subnetwork in accordance with the method as claimed in claim 1.

20. A computer program product, comprising a computer readable hardware storage device having computer readable program code stored therein, said program code executable by a processor of a computer system to implement a method that is able to be loaded directly into a memory of at least one digital computer, comprising program code parts that are suitable for performing the steps of the method as claimed in claim 1.

* * * * *